United States Patent [19] [11] 3,957,521
Ritzmann [45] May 18, 1976

[54] METHOD AND APPARATUS FOR THE HEAT TREATMENT OF FINE-GRAINED MATERIAL

[75] Inventor: Horst Ritzmann, Enniger, Germany

[73] Assignee: Polysius AG, Neubeckum, Germany

[22] Filed: Jan. 23, 1974

[21] Appl. No.: 435,845

[30] Foreign Application Priority Data
Feb. 13, 1973  Germany............................ 2307027

[52] U.S. Cl. ................................................ 106/100
[51] Int. Cl.² ............................................ C04B 7/44
[58] Field of Search ...................................... 106/100

[56] References Cited
UNITED STATES PATENTS
1,605,279   11/1926   Pike ..................................... 106/100
1,834,963   12/1931   Newhouse............................ 106/100
1,904,699   4/1933    Singmaster........................... 106/100
1,912,811   6/1933    Wechter ............................... 106/100

*Primary Examiner*—J. Poer

[57]  ABSTRACT

The heat treatment of fine-grained material such as ground raw cement comprises preheating the material, mixing the preheated material with fuel under conditions incapable of supporting combustion, subsequently combusting the fuel in intimate relation with the material, and finally firing the material in a rotary tube furnace.

8 Claims, 1 Drawing Figure

U.S. Patent May 18, 1976 3,957,521
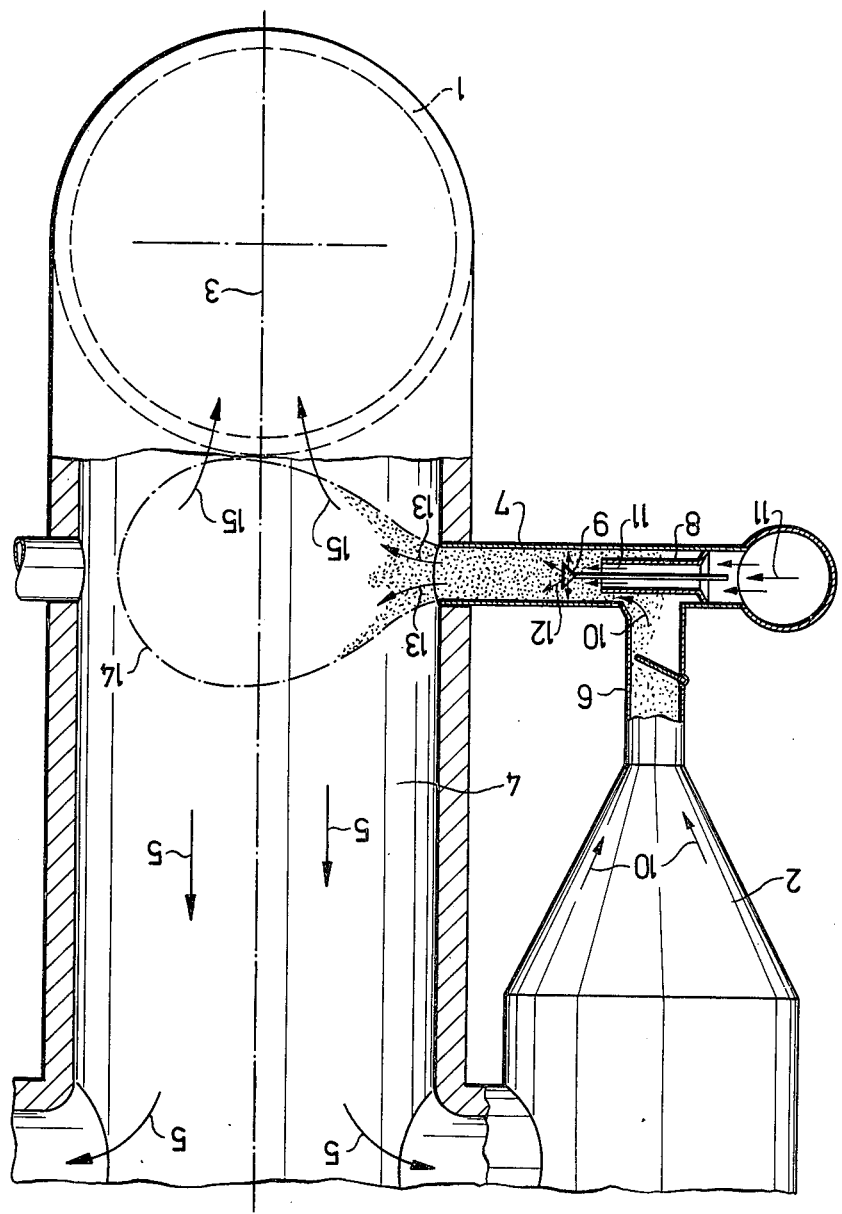

METHOD AND APPARATUS FOR THE HEAT TREATMENT OF FINE-GRAINED MATERIAL

This invention relates to a method for the heat treatment of fine-grained material, such as ground raw cement, which is first heated in a pre-heater with the hot exhaust gases from a rotary tube furnace, is then further heated in a pre-firing zone, and afterwards has its final firing in the rotary tube furnace. The invention also relates to a plant for carrying out the method.

In the manufacture of cement, alumina, lime, magnesite, dolomite and the like, the heat treatment of the fine-grained material is frequently effected by preliminary heating of the material in a pre-heater consisting of several cyclones, using the hot exhaust gases from a rotary tube furnace, before the material has its final firing or sintering in the rotary tube furnace. In this case by far the greatest amount of the heat must be supplied in the rotary tube furnace, while only a much smaller part of the total heat energy is applied to the material in the pre-heater. From the point of view of capitol costs, this distribution of heating effect between the rotary tube furnace and the pre-heater is unfavourable, since the specific costs of the rotary tube furnace are relatively high.

In order to enable the rotary tube furnace to have smaller dimensions in cross-section and/or length, attempts have previously been made to provide between the pre-heater and the rotary tube furnace a pre-firing zone wherein the pre-heated material is heated as high as possible (though without passing from the condition of powdered fluent solid into a condition of reduced fluidity due to incipient grain coarsening and the possible formation of a molten phase). The particular problem in designing this type of pre-firing zone is that extremely uniform feeding of fuel to the material is necessary in order to avoid overheating of individual particles of material, with all the associated disadvantages such as baking, agglomerate formation, etc.

In one known method this pre-firing zone is formed as a fluidised layer indirectly heated by burners, and from which the material passes into the rotary tube furnace. Another known method uses a firing chamber with tangential inlet and outlet for the material and fuel. The disadvantage of these known systems lies in the considerable capital costs of the pre-firing zone, whereby a considerable proportion of the savings permitted in the rotary tube furnace are lost. The invention is thus based on the avoidance of these defects by the provision of a method wherein the required uniform heat treatment of the material in the prefiring zone is made available with very slight expenditure on plant.

According to the invention this object is achieved in that, after leaving the pre-heater and before entering the pre-firing zone, the material is intimately mixed with fuel in a mixing zone wherein as yet combustion conditions are not present.

In the practice of the method according to the invention it has been found that completely uniform mixing of the pre-heated material with the fuel is the most important pre-requisite for enabling large amounts of heat to be transferred to the material during the subsequent firing process without overheating individual particles. While with the previously known method the material and the fuel were mixed together in the actual firing chamber (which necessarily leads to flame formation and hence to overheating individual particles of material), suitable steps are taken in the method provided by the present invention to ensure that combusion conditions are not yet present in the mixing zone.

This can for instance be effected by choosing a very high fuel-material concentration in the mixing zone. If completely homogeneous distribution of fuel within the mass of the fine-grained material has been achieved in this manner, the fuel particles, after passing from the mixing zone into the pre-firing zone, then burn to some extent in the immediate vicinity of the individual particles of material. In this manner the formation of a flame is avoided, as well as the resultant phenomena of agglomeration and overfiring.

According to a desirable further development of the method provided by the invention, at least part of the combustion air needed in the pre-firing zone also acts as carrier air which conveys the material and fuel from the mixing zone into the pre-firing zone.

In a plant having a pre-heater consisting of several cyclones, the mixing zone is preferably formed by a pipe adjacent the material conduit in the lowest cyclone, with the pipe ending in a larger cross-section chamber forming the pre-firing zone. On entry into this larger chamber the mixture formed of material, fuel and air is to some extent relaxed, and the conditions for combustion occur.

In accordance with the invention the pre-firing zone may comprise a part of the furnace transit chamber disposed between the rotary tube furnace and the lowest cyclone or cyclones of the pre-heater. Within the scope of the invention it is also possible to locate the pre-firing zone in the first part of the rotary tube furnace. In either instance a chamber which is in any case present and provided with a refractory wall lining is utilized as the pre-firing zone. The mixing pipe disposed between the material conduit in the lowest cyclone and the pre-firing zone involves only very slight extra expense, since the thermal load on this mixing pipe is by no means excessive.

A further advantage of the plant provided by the invention is that existing plant, consisting of a rotary tube furnace and a standard cyclone pre-heater, can be converted without difficulty in accordance with the invention. Nor are any difficulties involved in designing the plant so that it can be operated with or without a pre-firing zone as desired.

One embodiment of a plant for carrying out the method provided by the invention is shown in the drawing.

Of the plant for the heat-treatment of fine-grained material, for instance for firing ground raw cement, only the rotary tube furnace 1 is shown, together with one of the two bottom cyclones 2 of the cyclone pre-heater. The pre-heater is in usual manner built symmetrically about its centre axis 3, the right hand bottom cyclone 2 is not shown in the drawing.

Between the rotary tube furnace 1 and the cyclones 2 in the lowest stage of the pre-heater there is a furnace transit chamber 4 through which the exhaust gases from the rotary tube furnace flow (arrows 5) to the cyclones 2.

The material outlet pipe 6 of cyclone 2 (henceforward only the left hand one of the two identically formed lower cyclones 2 will be described) is connected to a mixer pipe 7 which opens into the furnace transit chamber 4. In the mixer pipe 7 there is a central nozzle 8 used for the supply of combustion air, preferably pre-heated. As the drawing shows, the nozzle 8 is advanced somewhat further into the mixer pipe 7 than the mouth of the feed conduit 6 from the cyclone 2.

Concentric with the nozzle 8 there is provided a fuel feeder 9 which projects somewhat further than nozzle 8 into the mixing zone formed by the pipe 7.

The parts of the plant described function as follows:

The material pre-heated in the cyclone heater (arrows 10) is carried into the mixer pipe 7 by the combustion air flowing in through the nozzle 8 (arrows 11), and is there intimately mixed with the fuel which emerges through the feeder 9.

In the mixing zone formed by the pipe 7 there is thus such a high fuel-material concentration that in spite of the presence of combustion air (which is also acting as carrier air), combustion conditions do not prevail. When the mixture of material, fuel and combustion air then enters the furnace transit chamber 4 (arrow 13), the mixture is relaxed on passage into this space with a larger cross-section. Thus a combustion zone 14 develops (only indicated schematically) wherein the individual fuel particles burn in the immediate vicinity of the individual particles of material and thus heat these cnsiderably (but without the particles of material losing their solid state).

A certain fraction of the material is upwardly entrained by the exhaust gases (arrows 5) from the rotary tube furnace and fed back into the cyclones 2. In this way there is a certain circulation of material between the furnace transit chamber 4 and the cyclones 2, and this is very desirable for transferring high thermal energy to the material before its entry into the rotary tube furnace. The main part of the highly heated material falls downwards from the pre-firing zone 14 and is then finally fired in the rotary tube furnace 1.

As regards the construction of the plant, numerous variations are possible within the ambit of the invention. Thus for instance the mixer pipe 7 can be downwardly inclined instead of horizontal. Also this mixer pipe can be allowed to enter directly into the rotary tube furnace (from the end) so that the pre-firing zone is formed by a first part of the furnace. In certain cases it may also be advantageous to provide a separator after the mixing zone to act as a pre-firing zone before the material enters the rotary tube furnace.

What is claimed is:

1. A method for the heat treatment of dry, fine-grained material such as ground raw cement, said method comprising heating said material in a pre-heater; conveying heated material from said per-heater to a mixing zone; mixing said material with fuel in said mixing zone while maintaining non-conbustive conditions in said zone; delivering mixed material and fuel to a prefiring zone; combusting said fuel in said pre-firing zone; and subsequently delivering said material to a final firing zone.

2. A method according to claim 1 including directing heat from said final firing zone to said preheater for heating the material therein.

3. A method according to claim 1 including expanding the volume of the mixed material and fuel upon the delivery thereof to said pre-firing zone.

4. A method according to claim 3 including directing heat from said final firing zone to said pre-firing zone to combust said fuel.

5. A method according to claim 1 wherein the conveying of said material from said mixing zone to said pre-firing zone is effected by air.

6. A method according to claim 5 wherein said air also constitutes combustion air in said pre-firing zone.

7. A method according to claim 1 wherein noncombustion conditions are maintained in said mixing zone by maintaining such a high fuel-material concentration that combusion cannot be supported.

8. A method for the heat treatment of dry, fine-grained material such as ground raw cement prior to firing said material in a firing zone through which hot waste gases pass, said method comprising heating said material in a pre-heater by means of said waste gases; delivering heated material from said pre-heater to a mixing zone; mixing heated material and fuel in said mixing zone while maintaining non-combustive conditions in said mixing zone; delivering mixed material and fuel from said mixing zone to a pre-firing zone through which said waste gases pass; combusting said fuel in said pre-firing zone; and subsequently delivering said material from said pre-firing zone to a final firing zone.

* * * * *